United States Patent [19]

Aubert

[11] Patent Number: 4,693,279

[45] Date of Patent: Sep. 15, 1987

[54] DEVICE FOR REMOVABLY FIXING AN INTERNAL STRUCTURE TO A CIRCULAR WALL INSIDE AN ENVELOPE

[75] Inventor: Gilles Aubert, Orsay, France

[73] Assignee: Commissariat a l'Energie Atomique, Paris, France

[21] Appl. No.: 827,227

[22] Filed: Feb. 5, 1986

Related U.S. Application Data

[63] Continuation of Ser. No. 597,667, Apr. 6, 1984, abandoned.

[30] Foreign Application Priority Data

Apr. 14, 1983 [FR] France .................. 83 06110

[51] Int. Cl.⁴ .................... F16L 9/18; F16L 57/00
[52] U.S. Cl. ........................ 138/108; 138/26; 138/103; 138/111; 138/113; 138/114; 138/178; 138/148
[58] Field of Search ............ 138/26, 27, 28, 32, 138/89, 97, 98, 103, 111, 113, 114, 115, 148, 178, 108; 16/2, 108; 220/410, 437, 445, 448

[56] References Cited

U.S. PATENT DOCUMENTS

| | | | |
|---|---|---|---|
| 1,087,443 | 2/1914 | Hallgreen | 138/121 X |
| 2,899,098 | 8/1959 | Gits | 220/410 |
| 2,959,196 | 11/1960 | Truesdell et al. | 138/148 |
| 3,173,196 | 3/1965 | Grimm | 138/148 X |
| 3,302,820 | 2/1967 | Londer et al. | 220/410 X |
| 3,684,220 | 8/1972 | Logsdon | 16/2 X |
| 3,765,559 | 10/1973 | Sauey et al. | 220/410 |
| 3,894,309 | 7/1975 | Yuda | 16/2 |
| 3,937,255 | 2/1976 | Barnert | 138/113 X |

FOREIGN PATENT DOCUMENTS 192956  2/1923  United Kingdom ............... 138/28

Primary Examiner—James E. Bryant, III

[57] ABSTRACT

A device for the detachable fixing of an internal structure to a circular wall of a pipe or container.

The device comprises one or more deformable annular members having blocks regularly distributed over its periphery. The application of radial forces between the blocks reduces the diameter level therewith and makes it possible to fit and remove the device.

Application more particularly to the fixing of internal structures in the primary circuit of pressurized water reactors.

3 Claims, 4 Drawing Figures

DEVICE FOR REMOVABLY FIXING AN INTERNAL STRUCTURE TO A CIRCULAR WALL INSIDE AN ENVELOPE

This application is a continuation of application Ser. No. 597,667, filed Apr. 6, 1984, now abandoned.

BACKGROUND OF THE INVENTION

The present invention relates to a device for fixing an internal structure in a removable or detachable manner to a wall having a circular cross-section, formed within an envelope, such as a pipe or a container.

Such a device more particularly applies to fixing certain structures within the primary circuit of a pressurized water reactor. However, this application is not limitative and the device according to the invention can be used in all cases where it is necessary to fix in a detachable manner a structure within a wall having a circular cross-section without damaging the latter and without there being any clearance between the internal structure and the wall to which it is fixed.

In the particular case of fixing internal structures in enclosures and pipes of the primary circuit of pressurized water nuclear reactors, said fixture must comply with conditions which are very difficult to fulfil. Thus, the fixing of internal structures must not prejudice the security or safety of the reactor pressure envelope and must make it possible to permit the inspection of the envelope in service via the interior of the primary circuit. As a result of the latter constraint, the internal structures must be dismantlable and there must be no reliefs on the inner wall of the pressure envelope. Moreover, due to the hydrodynamic forces produced by the outflow of the coolant, the internal structures must be secured without any clearance in order to prevent vibrations. Moreover, in order not to increase the pressure drop of the circuit, the device for fixing the internal structures must have minimum overall dimensions. Finally, it must be possible to dismantle the internal structures in a remote manner in the most radioactive parts of the circuit, which makes it impossible to use complex mechanisms.

In the present state of the art, the fixing of certain internal structures of nuclear reactors is sometimes brought about by heat shrinkage. This fixing procedure consists of using the temperature rise of a circuit in order to take advantage of a thermal expansion of the internal structure, which is greater than that of the pressure envelope. Thus, for the two structures, use is made of materials having different heat expansion coefficients.

This conventional procedure suffers from numerous disadvantages. Firstly the differential heat expansion between the materials forming the two structures is limited, so that very precise machining operations are required. Moreover, it leads to differential longitudinal expansions, which may be the cause of various hazards. It can lead to high stress levels within the pressure envelope. Finally, the parts are machined in such a way as to be fixed at the normal operating temperature of the reactor, which implies that the internal structures are secured with a clearance in the cold state, so that there is a high vibration risk in this state.

SUMMARY OF THE INVENTION

The present invention relates to a detachable fixing device not suffering from the disadvantages of the prior art and more particularly making it possible to ensure in a particularly simple manner a dismantlable cold fixing without any clearance in all cases where a fixture of this type is desirable.

Therefore the present invention proposes a device for the detachable fixing of an internal structure to a wall having a circular cross-section formed within an envelope, wherein it comprises at least one deformable annular member having locks in relief regularly distributed over the periphery of its outer face, the external diameter of said member to the right of the blocks slightly exceeding the diameter of the inner wall, when the device is in the inoperative state, and which can be reduced to a value smaller than the diameter of said inner wall when radial forces are applied between the blocks within said deformable annular member.

In the case of a pressurized envelope, the deformable annular member can be in the form of a ferrule having a series of relief blocks at each of its ends, so as to form an internal safety structure making it possible to limit to a given value the leakage flow in the case of a fracture of the pressurized envelope.

In the case where the internal structure incorporates a pipe arranged within the deformable annular member, in order more particularly to separate two fluid flows, said pipe can be connected to the deformable annular member by radial fins located between the blocks, in such a way that the radial forces can be applied to the inner pipe and transmitted to the deformable annular member by said fins. In this case, the deformable annular member can be in the form of a ferrule constituting an internal safety structure when the envelope is under pressure. The inner pipe can also be fixed to the interior of the envelope by a plurality of rings distributed along said pipe.

BRIEF DESCRIPTION OF THE DRAWINGS

The invention is described in greater detail hereinafter relative to various nonlimitative embodiments of the detachable fixing device according to the invention and with reference to the attached drawings, wherein show.

DETAILED DESCRIPTION OF THE PREFERRED EMBODIMENTS

Figure 1:
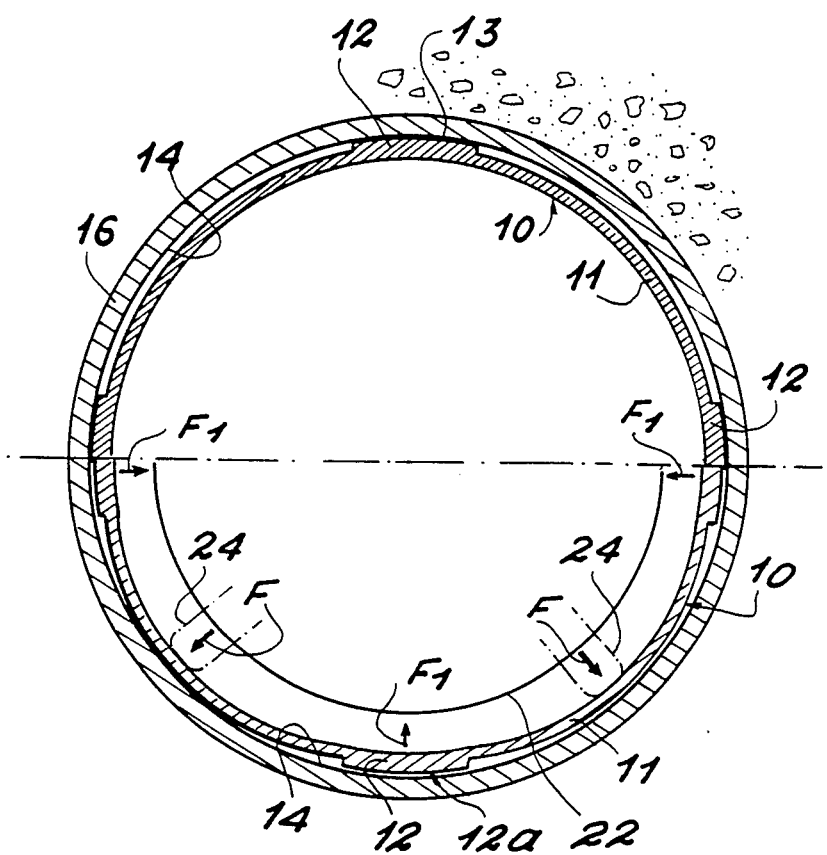
FIG. 1 in cross-section, a detachable fixing device according to the invention applied to the circular inner wall of an envelope in the upper half of the drawing and during fitting or removal of the lower half of the drawing.

As is more particularly apparent from FIG. 1, the principle of the fixing device according to the invention is very simple. Device 10 essentially comprises a deformable annular member 11 whose length can vary. As will be shown hereinafter, member 11 can be ring when it is short, or a ferrule when it is longer.

According to the invention, the annular member 11 is provided on its outer face with a certain number of blocks 12, (four in the represented embodiment). These blocks 12 are arranged at regular intervals over the periphery of member 11 (e.g. at 90° from one another in FIG. 1). The outer surface 13 of each of the blocks 12 defines in cross-section a circular arc concentric to the ramainder of member 11.

When annular member 11 is introduced into member 16 (as shown in the lower half of FIG. 1) the outer surfaces 13 of blocks 12 are separated from the inner wall of member 16 and the outer surfaces of member 11 tend to approach the inner surfaces of member 16. Upon fixing of the annular member 11 within member 16, (as shown in the upper half of FIG. 1) the outer surface 13 of blocks 12 tend to exceed the internal diameter of member 16 and are thereby retained or fixed within same.

According to the invention, member 11 can be deformed in such a way that it loses its annular shape but without any modification taking place to its circumferential length. Thus, it is possible by applying to the interior of said member, radial forces F at the centre of the gaps formed between blocks 12 (i.e. at 45° relative thereto in FIG. 1) to deform member 11, in the manner shown in the lower half of FIG. 1. This leads to an increase in the diameter of member 11 at this level. In view of the fact that the circumferential length of said member remains constant, the diameter thereof to the right of the blocks (i.e. level with surfaces 13) is reduced to a value less than the internal diameter of wall 14 (arrows $F_1$ in FIG. 1). Device 10 can then be introduced cold into bore 14, or can be removed therefrom without difficulty.

The application or radial forces F can be effected by any known means and more particularly with the aid of an arm 22, which axially penetrates the interior of member 11 and provided with radially closed jacks 24.

When the application of the radial forces is discontinued, member 11 resumes its normal shape. When this relaxation is performed after the introduction of the member into cylindrical wall 14, it has the effect of the cold elastic securing or locking of blocks 12 on to the inner wall of envelope 16, in the manner shown in the upper half of FIG. 1.

Obviously the number and geometry of the relief blocks 12 on the outer wall of deformable annular member 11 are optimized as a function of the special conditions of the envisaged application.

Device 10 is preferably made from metal with a high yield strength.

Figure 2:
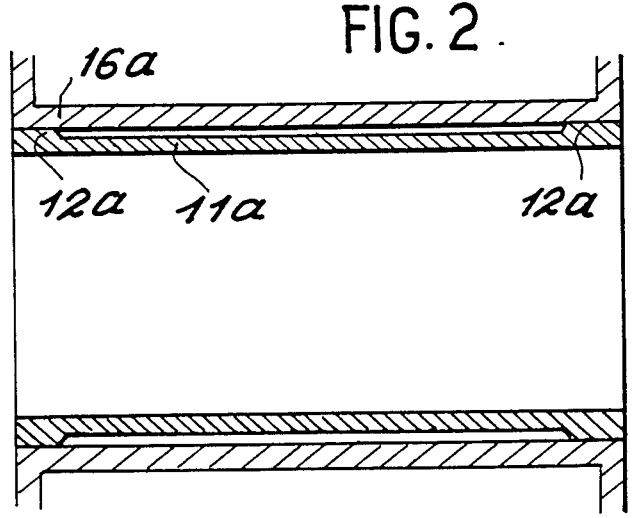
FIG. 2 a longitudinal sectional view of a pressurized pipe in which a safety sleeve has been fixed with the aid of the detachable fixing device according to the invention.

An example of the application of the device according to the invention is shown in FIG. 2. The envelope into which the device according to the invention is to be fixed is a pressurized pipe 16a and the said device is used for limiting the consequences of the possible fracture of said pipe. Therefore the annular member is shaped like a ferrule 11a carrying at its ends a series of blocks 12a regularly distributed over its periphery. Ferrule 11a extends over the entire length of pipe 16a and thus constitutes a safety sleeve making it possible to limit the leakage flow of the pipe to a given value in the case of said pipe fracturing. In this case, ferrule 11a constitutes both the detachable fixing device and the internal structure which it is wished to fix within the pipe.

Such a safety sleeve can in particular be fitted in a pipe of the primary circuit of a pressurized water nuclear reactor, as is more particularly illustrated by French Patent Application No. 79 26871 in the name of the Commissariat á l'Energie Atomique.

Figure 3:
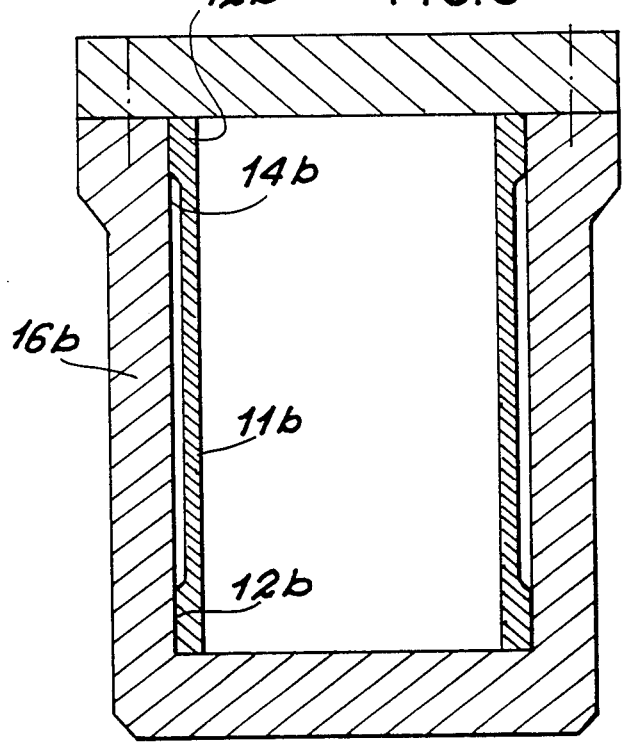
FIG. 3 a longitudinal sectional view of a pressurized container within which has been fitted a safety sleeve in the same way as in FIG. 2.

As illustrated in FIG. 3, the device according to the invention can also fulfil the function of a safety sleeve within a pressurized container 16b having an inner wall 14b with a circular cross-section. As in the application described with reference to FIG. 2, the deformable annular member is then in the form of a ferrule 11b, carrying a series of blocks 12b regularly distributed at each of its ends. Ferrule 11b then preferably extends over the entire height of container 16b.

However, the deformable annular member constituting the detachable fixing device according to the invention can also be separate from the internal structure which it is wished to fix within the envelope.

Figure 4:
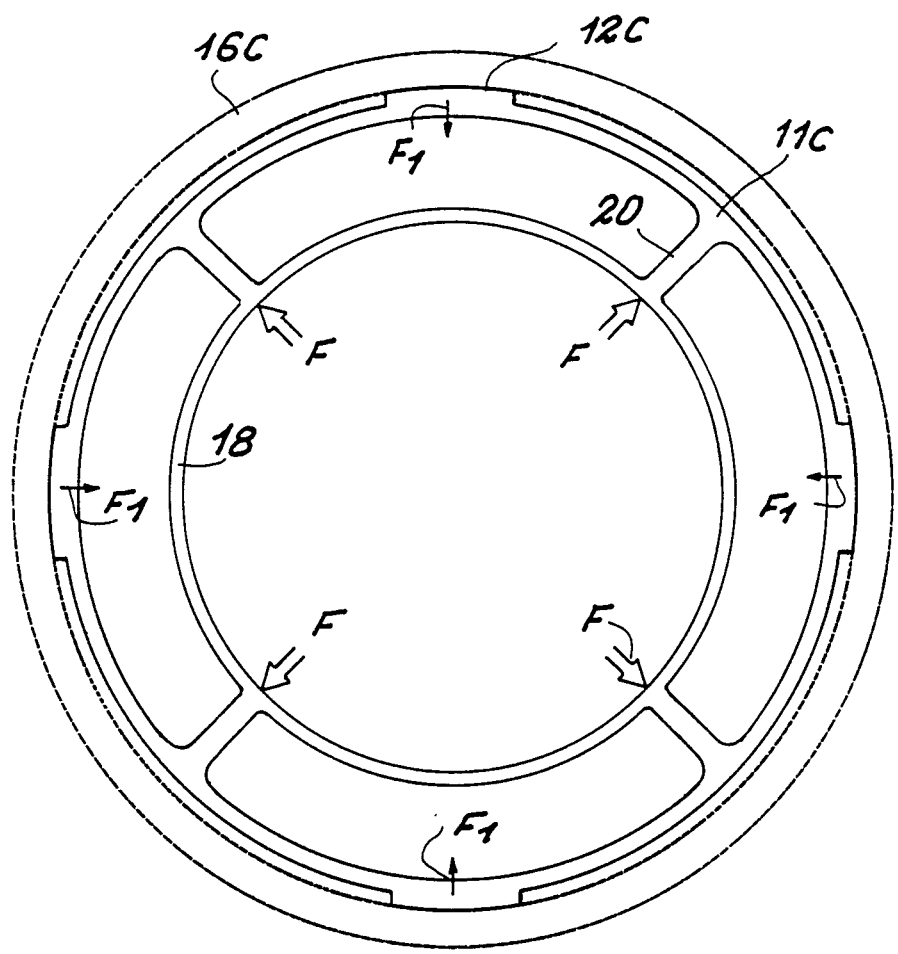
FIG. 4 in cross-section, the fixing of an inner pipe within a larger diameter pipe by means of the device according to the invention.

Thus, FIG. 4 shows the application of the device according to the invention to the fixing of an inner coaxial pipe 18 within an outer pipe 16c. Inner pipe 18 can be particularly used for separating two flows in opposite directions of the heat transfer fluid in the primary circuit of a nuclear reactor. This is also illustrated by the aforementioned French Patent Application No. 79 26871.

As is illustrated by FIG. 4, the device for fixing pipe 18 within pipe 16c comprises, according to the invention, one or more deformable annular members 11c provided on their periphery with regularly distributed blocks 12c.

Members 11c can be constituted by a plurality of rings reguarly distributed over the entire length of pipe 18. However, when pipe 16c is a pressurized pipe, it is possible to use the fixing device for fulfilling the aforementioned function of a safety sleeve (cf. FIG. 2). Member 11c is then constituted by a single ferrule extending over the entire length of pipe 16c.

When there are means for applying radial forces F to member or members 11c, which can be introduced between said members and inner pipe 18, the supporting of the latter by the device according to the invention can be brought about by any connections means and particularly by fins 20 leaving from the areas of the member or members 11c located between the blocks, so as to permit the deformation of said members.

However, it is readily apparent that in most cases, the overall dimensions of the means for applying the radial forces F are too large to permit their introduction between the fixing device and the inner pipe. In the more usual case shown in FIG. 4, it is consequently necessary for the means by which the inner pipe 18 is fixed to the member or members 11c simultaneously ensure the transmission thereto of radial forces F, which are applied to the interior of pipe 18.

As illustrated in FIG. 4, these connection means are then constituted by fins 20, which are arranged radially along median planes with respect to the spaces separating blocks 12c, i.e. at 45° relative to the blocks when there are four such blocks in the manner illustrated in FIG. 4.

Although the present invention is more particularly applicable to fixing internal structures within envelopes, such as pressurized pipes or containers of the primary circuit of a nuclear reactor, it is in no way limited thereto. Moreover, although the device according to the invention can in itself constitute the internal structure to be fixed in the manner illustrated in FIGS. 2 and 3 and although it can be used in the manner illustrated in FIG. 4, for fixing an inner pipe with a larger diameter pipe, it is clear that it can also be used for fixing an internal structure of any other nature to the inner circular wall of a random envelope.

What is claimed is:

1. A device for fixing an internal structure to an inner wall of an outer cylindrical body, said inner wall having an internal diameter, comprising at least one continuous deformable, resilient annular member constructed of metal having a high yield strength, said body having a fixed length and being provided with a plurality of circumferentially spaced members at each end which extend radially and outwardly of said body, said spaced members being spaced approximately 90° apart each projection terminating in an outer arcuate face conforming to the curvature of the inner wall of said cylindrical body to define an external diameter, the space between the spaced members defining a means for applying an inner radial force to reduce the external diameter, said annular member having a circumferential surface which is completely continuous and uninterrupted throughout the entire circumferential extent thereof, the external diameter of said spaced members exceeding said internal diameter of said inner wall to adapt the device to be placed in a position to fix said annular member to said inner wall, said fixed length of said body causing adjacent spaced members to move radially inward of said body upon application of localized radially outwardly directed force to said body between said adjacent spaced members to reduce said body outer diameter at said adjacent spaced members to a value less than said inner wall internal diameter to permit fixing and removal of said annular member in relation to the inner wall of said cylindrical body.

2. A device according to claim 1, wherein said deformable annular member is provided with an inner cylindrical body spaced inwardly therefrom and connected thereto by radial fins disposed at positions staggered between said circumferentially spaced members, whereby to facilitate fixing and removal of said device by application and removal of force on the interior of said inner cylindrical body in the region of said fins.

3. A device according to claim 2, wherein said deformable annular member is a cylindrical body forming together with said inner cylindrical body two spaced concentric cylindrical bodies.

* * * * *